Dec. 16, 1941. G. T. LAMPTON 2,266,050
MANUFACTURE OF PROPELLER BLADES
Filed Feb. 18, 1937 3 Sheets-Sheet 1
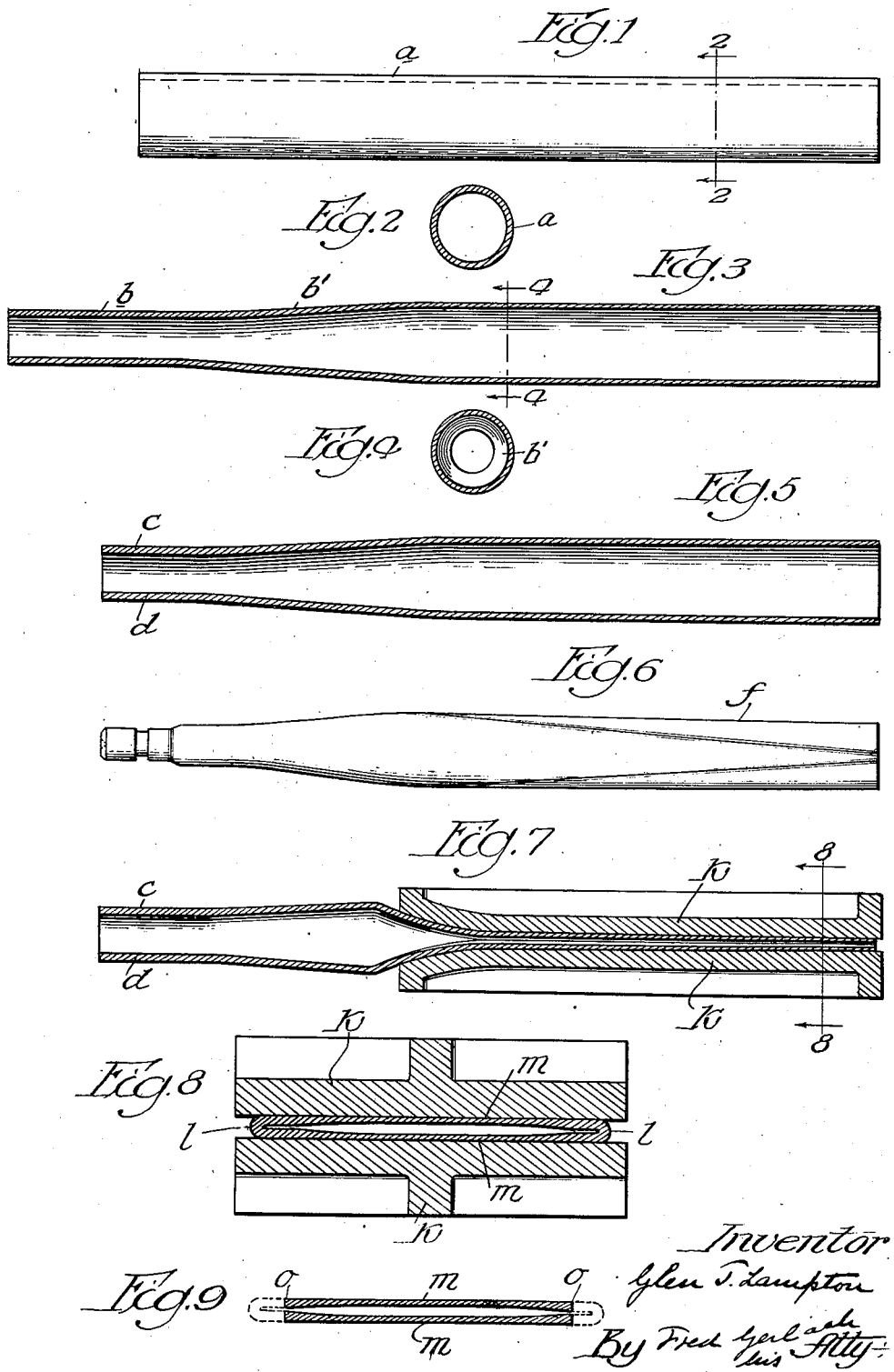

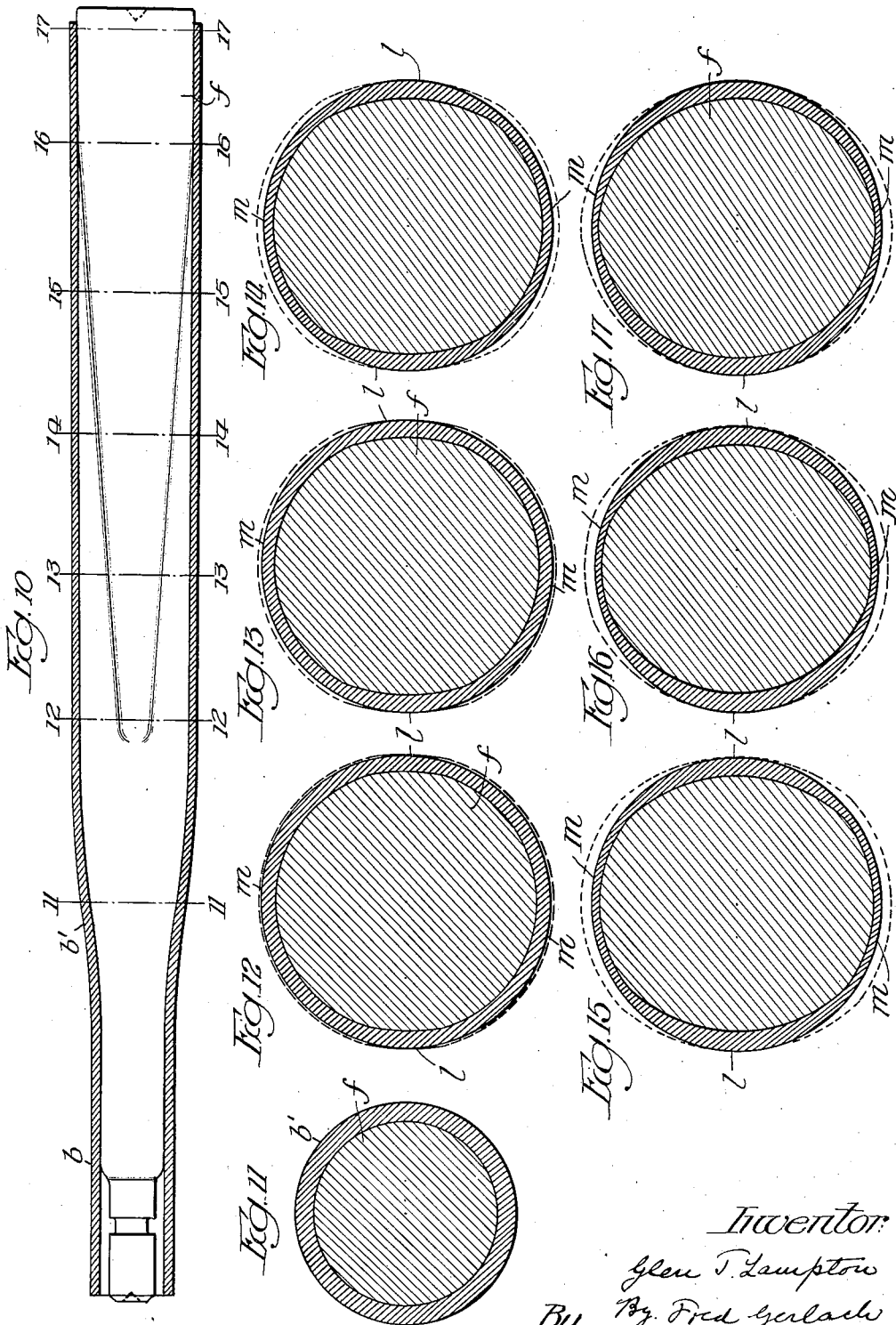
Dec. 16, 1941. G. T. LAMPTON 2,266,050
MANUFACTURE OF PROPELLER BLADES
Filed Feb. 18, 1937 3 Sheets-Sheet 2

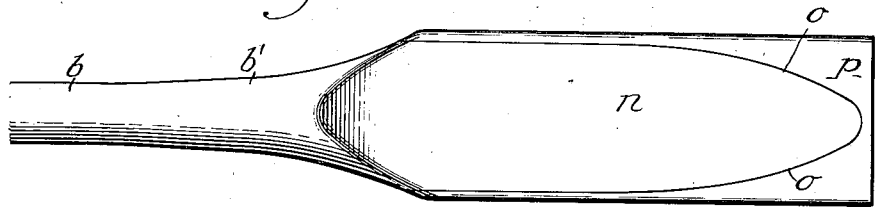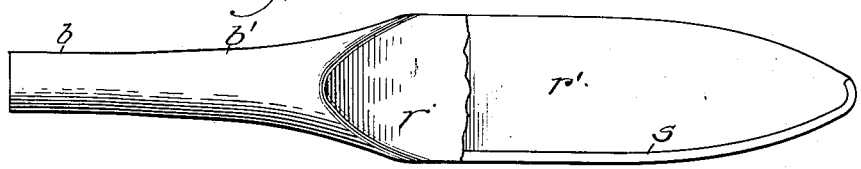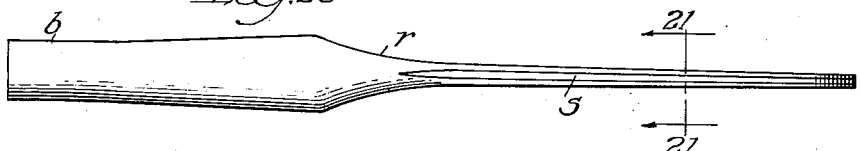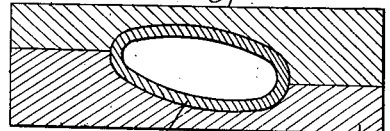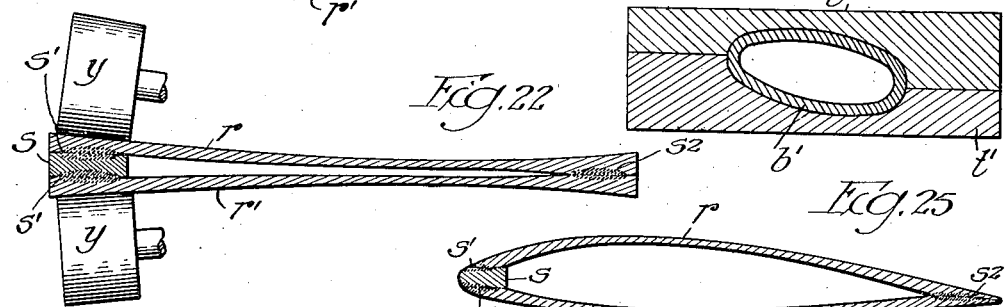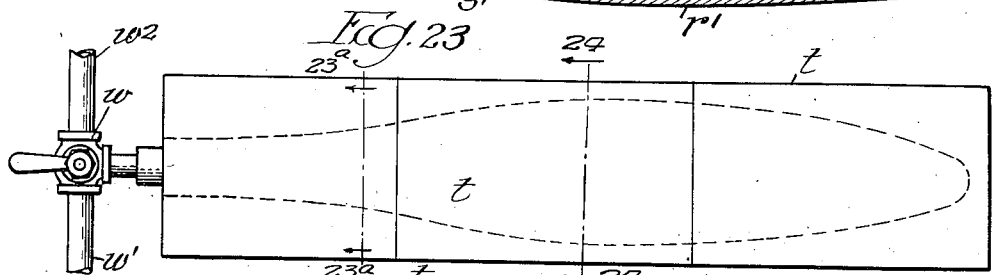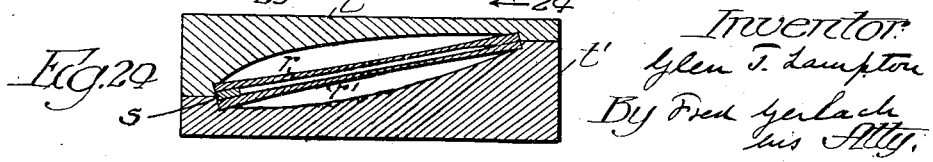

Patented Dec. 16, 1941

2,266,050

UNITED STATES PATENT OFFICE 2,266,050

MANUFACTURE OF PROPELLER BLADES

Glen T. Lampton, Williamsport, Pa., assignor to Aviation Manufacturing Corporation, Williamsport, Pa., a corporation of Delaware Application February 18, 1937, Serial No. 126,390

7 Claims. (Cl. 29—156.8)

The invention relates to the manufacture of metal propeller blades for airplanes.

Airplane propellers are continuously subjected to vibration resulting in constant "breathing" of the airfoil sections. During such "breathing" the inner surfaces of the blade are alternately subjected to transverse tensile and compression stresses which are at a maximum at the leading and trailing edges. This transverse tension combines with the radial centrifugal tension and gives a resultant tensile stress which, when it exceeds the endurance or fatigue limits of the material, causes failures.

In hollow steel blades, as heretofore constructed, the most common type of failure has resulted from a crack originating on the inner surface of the blade at the line of fusion of either the leading or trailing edge welds in either the camber or leading face sections. Such a crack works through to the surface and then follows along the edge of the weld.

Another class of failures in hollow steel blades is attributable to the greater stiffness of the more heavily curved camber section and its correspondingly greater resistance to the vibration of the blade than a comparatively flat face sheet and the inertia forces of the central mass of the face sheet impressing bending stresses at the edges. These tensile values are important because they add to the radial tension.

The primary object of the invention is to provide a method of manufacturing a propeller blade which will overcome the failures attributable to the failures of blades from these causes.

Another object of the invention is to provide an improved method of producing propeller blades from tubular blanks whereby the cross sectional wall thickness of the airfoil sections will vary to provide ideal variation in beam depth, to reduce the inertia at the mid-points of the sections, to increase the resistance of the edges of the plate to transverse bending, and to increase the area of the welds of both the leading and trailing edges for achievement of maximum weld strength.

One feature of the invention consists in varying the wall-thickness of the tubular blank while it is still in tubular form so that the walls of the portions of the blank for the thrust and suction faces will be of varying thickness in cross section for the purpose of reducing the inertia of the plates at the mid-points of the section and increasing the resistance of the edges of the blade to transverse bending and also increasing the area of the welds of both the leading and trailing edges.

Another feature of the invention consists in providing a method by which the tubular blank is deformed for expeditiously varying the wall-thickness of the section, by grinding or otherwise removing the metal from the blank to provide for the sections with varying wall-thickness as aforesaid.

Other objects of the invention will appear from the detailed description.

The invention consists in the several novel features which are hereinafter set forth and are more particularly defined by claims at the conclusion hereof.

In the drawings: Fig. 1 is a side elevation of a tubular blank from which the blade is formed. Fig. 2 is a section on line 2—2 of Fig. 1. Fig. 3 is a longitudinal section of the blank after one end portion has been swaged and reduced in diameter for the tubular shank or inner end of the blade. Fig. 4 is a section on line 4—4 of Fig. 3. Fig. 5 is a longitudinal section of the swaged blank after its shank has been upset to provide an adequate wall-thickness for the attachment of the blade to the hub. Fig. 6 is a plan of the arbor or core inserted in the tubular blank to deform the airfoil portion of the blank from cylindrical into elliptical cross-section while the metal of the blank is being trimmed to produce minimum wall-thickness at the center of the blade-faces with maximum thickness at their margins. Fig. 7 is a section illustrating the flattening of the outer portion of the tubular blank between a pair of dies. Fig. 8 is a section on line 8—8 of Fig. 7. Fig. 9 is a transverse section of the flattened blank illustrating the lines along which the margins of the blank are trimmed or sheared to form the face-portions or sections of the blade.

Fig. 10 is a side elevation of the tubular blank stretched on the arbor or core to de-form the cylindrical portion of the blank for trimming its wall to provide face-portions or sections of varying wall-thickness. Fig. 11 is a transverse section on line 11—11 of Fig. 10. Fig. 12 is a section on line 12—12 of Fig. 10. Fig. 13 is a section on line 13—13 of Fig. 10. Fig. 14 is a section on line 14—14 of Fig. 10. Fig. 15 is a section on line 15—15 of Fig. 10. Fig. 16 is a section on line 16—16 of Fig. 10. Fig. 17 is a section on line 17—17 of Fig. 10. Fig. 18 is a plan of the blank after it has been flattened in the dies, as shown in Figs. 7 and 8, and illustrating the manner of trimming the edges therefrom to provide the sections or plates for the faces of the blade. Fig. 19 illustrates the flattened blank after it has been trimmed and with a reinforcing strip between the faces for the leading edge of the blade. Fig. 20 is an elevation of the blank as shown in Fig. 19. Fig. 21 is a section on line 21—21 of Fig. 20. Fig. 22 is a section illustrating the manner of welding the face-sections at the leading and trailing edges. Fig. 23 is a plan of dies wherein and whereby the blank, after it has been welded, will be expanded to airfoil form. Fig. 23a is a section on line 23a—23a of Fig. 23. Fig. 24 is a section on line 24—24 of Fig. 23 before the welded blank has been expanded. Fig. 25 is a typical section through the finished blade.

The invention is exemplified in the production of a propeller blade from a seamless hollow tube $a$ (Figs. 1 and 2) with a cylindrical wall of uniform thickness and cut to the proper length for making the blade. The preferred metal is steel. The scale, pits, die marks and other irregularities will first be removed from the inner periphery of the tube, for example, by a honing machine so that the inner periphery will be uniform in dimensions and free from imperfections.

Next, the tubular blank will be reduced in diameter by swaging to form a cylindrical shank portion $b$ at one end thereof and an intermediate portion $b'$ of gradually increasing diameter extending from the shank portion to approximately mid-length of the blank (Fig. 2).

Next, the shank portion $b$ is upset in axial direction to provide adequate wall-thickness for attachment of the shank to the hub substantially as shown at $c$ (Fig. 5) if the swaging does not produce sufficient wall-thickness in the shank for that purpose. When it is desirable to reinforce the shank of the blade or to provide a pilot for anti-friction bearings, as used in variable pitch propellers, the socket in the inner end of the blade is machined and a reinforcing plug or sleeve is inserted in and securely attached to the blank by a bond such as results from brazing with copper in the presence of hydrogen, as understood in the art.

An arbor or core $f$ which is adapted to be driven into the blank from its outer end, is used to deform the blank from the outer end of tapered portion $b'$ to the tip end. This arbor is machined so that the portion for deforming the blank will be generally elliptical and of gradually increasing major diameter and gradually decreasing minor diameter from approximately the outer end of the tapered portion $b'$ of the blank to the tip so that its eccentricity progressively increases from approximately mid-length of the blank to the tip. This arbor, when driven into the tubular blank, will stretch or bend the blank so its peripheral wall will conform to the periphery of the arbor. The eccentricity of the blank will vary according to the variation in the major and minor diameters of the arbor. The arbor, with the blank stretched thereon, will then be placed in a lathe or secured so that its central axis will be fixed. Next, the diametrically opposite arcuate portions of the outer face of the blank will be ground or trimmed off, as indicated at $m$, from the major diameter of the blank on arcs concentric with the center of the arbor. The arcuate portions ground off will be of gradually and progressively decreasing circumferential width and of gradually increasing depth, as illustrated in Figs. 12 to 17 inclusive. The wall-portions where the metal is removed will have a reduced wall-thickness at $m, m$, with gradually increasing thickness merging into the maximum wall-thickness at diametrically opposite points, as indicated at $l, l$ between the portions $m, m$. Preferably the grinding will be symmetrically done on arcs concentric with the center of the axis of the arbor and on opposite sides of the major diameter of the arbor and blank, thus leaving the maximum wall-thickness of the blank at the minor diameter of the arbor and blank. This grinding provides integral blank portions for forming the airfoil faces or sections of the blades with maximum wall-thickness at their leading and trailing edges and reduced wall-thickness between the edge portions and also serves to taper the wall thickness as desired from the portion $b$ to the tip-forming portion of the blank. For example, at the longitudinal station illustrated in Fig. 12, approximately where the welds between the trailing and leading faces commence, nearly the full wall-thickness of the blank will be left at $m, m$ on the opposite sides of the arbor and metal will be removed so that the wall-thickness at $l, l$ will be slightly greater. At the next station illustrated in Fig. 13, the wall-thickness intermediate the sides will be reduced to a slightly greater extent, and the circumferential extent of the full thickness will be slightly increased. At the next station shown in Fig. 14, the arcuate portions removed will be slightly less in circumferential extent and greater in depth. The arcuate portions removed from the remaining stations shown in Figs. 15, 16 and 17 progressively increase in depth and decrease in circumferential extent. In deforming the tubular blank by or stretching it around a core or arbor the surface may be ground or trimmed on arcs struck from the center axis of the arbor, so that the grinding or removal of the metal may be done without resetting the arbor to different centers or requiring the axis of movement of the grinding tool to be set for movement through constantly changing arcs. This greatly expedites this step in the manufacture of the blades. This removal of metal exemplifies a method of providing adequate wall-thickness and area for the welds at both the leading and trailing edges and reduced wall-thickness intermediate the edges of the face-sections for the completion of the blades, as hereinafter described.

The blank, before being removed from the arbor $f$, will be marked to indicate the center lines of maximum or minimum wall thickness for the location of the thick and thin portions of the blank during the subsequent forming operations of the face-sections. The arbor $f$ will be removed from the blank after the grinding or trimming operation has been completed.

Next, the blank is heated to a point just below recalescence temperature and placed between a pair of dies $k$ which are adapted to flatten the outer portion of the tubular blank substantially from a point mid-length of the blank to its outer end (Figs. 7 and 8). The blank is positioned in these dies so that the centers of the diametrically opposite points of greatest wall-thickness will be located at the lines where the blank is folded (Fig. 8) and the center lines of the zones of reduced wall-thickness will be at the center of the dies. The dies $k$ fold the wall portions $l$ of the blank along their transverse center so that the edge portions will be of two thicknesses, with a slight space between them. This flattening, while the blank is just below recalescence temperature, avoids the possibility of fracture at the folds and also prevents hardening by heat transference to the flattening dies which would retard or render difficult the trimming operations. This flattening operation is formed so that the edges of the flattened portion of the blank can be quickly trimmed by a bandsaw or similar machine to form airfoil face-sections for the blade in a subsequent operation.

When removed from the dies $k$, the blank will be of the form shown in Fig. 18. The edges of both of the folds of the flattened portions of the blank are then trimmed therefrom on the line $o$. This severs the folded edges and the end-portion $p$ from the blank and produces a bifurcated portion forming two sections $r, r'$ which are adapted to be shaped to form the leading and trailing faces or sides of the blade. The cut $o$ is made to conform approximately to the desired profile of the leading and trailing edges of the blade. This cut is made at the margins of or slightly outwardly of the cutaway zones $m$, as illustrated in Fig. 9, so that the edge forming portions along the margin of the cut will have the greater and substantially the original wall-thickness. The margins of the thinned areas $m$ merge gradually into the zones $l$ of greater thickness, so they will be practically invisible when the blank has been flattened, as shown in Fig. 18. When the blank has been thus flattened, each of the face-sections $r, r'$ will have a maximum wall-thickness at its margins to provide adequate area and thickness for welding the leading and trailing edges and central portions of minimum wall-thickness with gradually increasing wall-thickness between the central portions and the margins. The wall-thickness of the center portions of the sections will taper longitudinally from mid-length to tip. These sections will be integral with the tubular shank portion $b$ and the intermediate tubular portion $b'$.

Next, the margins at one side of the sections $r, r'$ will be spread apart and a flat strip $s$ will be inserted in the gap, as shown in Fig. 21. This strip $s$ is curved to conform to the leading edge of the sections $r, r'$ from the tip to the tubular portion $b'$; tapers in thickness longitudinally (Fig. 20); and is of sufficient width to provide ample weld area for joining the sections together. After the strip $s$ has been inserted, the mating faces of sections $r, r'$ and strip $s$ are welded together, as indicated at $s'$ while passing between suitable rolls $y$ and the mating faces of said sections are welded together as at $s^2$ along the trailing edge so that the margins of the sections will be continuously and securely joined at the leading and trailing edges and around the tip of the blade to the points where the blank has been left tubular.

Next, the blank with its sections $r, r'$ welded together, is placed between shaping dies $t, t'$. The cavities in the dies correspond substantially to the airfoil section of the finished blade. The mating halves of the dies are shaped so that the portion $b'$ between the shank portion and the face-sections will be de-formed into the desired airfoil section when the dies are brought together, as shown in Fig. 23a. At this stage the blank consists of tubular portions $b$—$b'$ and the flat sections $r$—$r'$ which have their margins joined together directly at one side and through the strip $s$ at the other, and form a double-walled structure which is nearly flat in cross-section, as shown in Fig. 24. The cavities in the dies $t, t'$ around the sections $r, r'$ are shaped to restrict the expansion of said sections to airfoil form for the leading and trailing faces.

The steel blank will be heated above recalescence temperature before the dies $t, t'$ are brought together. A two-way cock $w$ with a branch $w'$ leading from a supply of gaseous fluid under pressure, say 300 lbs., and with a branch $w^2$ leading from a supply of fluid such as quenching oil under pressure, is temporarily connected to the plug $d$ in the shank portion of the blank. Next, the cock $w$ will be opened to admit gaseous pressure into the hot blank to inflate it and cause the sections $r, r'$ to expand until they are in contact with, and conform to, the walls of the die cavity and have the desired shape for the leading and trailing faces without appreciably cooling the blank.

Next, the cock $w$ will be manipulated to cut off the supply of gaseous pressure and to deliver a spray of quenching oil or other fluid over the inner surfaces of the blade at a controlled rate and controlled pressure, so that the blade will be cooled at a rate greater than the critical cooling rate of the metal and will, therefore, be hardened. During the cooling of the blade, the dies may be opened sufficiently to position the welded edges of the blade loosely so that the sections of the blade are not restrained from shrinking in width as they cool.

Next, the outer surfaces of the blade are polished and the leading and trailing edges are finished to the desired contour, as shown in Fig. 25. After the blade has been thus manufactured, it is tempered or otherwise treated to obtain the desired physical properties of the metal.

The invention exemplifies a method of producing a hollow metal propeller blade for aircraft formed of steel in which the blade is made from a section of tubing with face-sections having walls of varying thickness from their center to the leading and trailing edges. This feature overcomes failures or fractures in hollow steel blades which originate at the line of fusion of either of the leading or trailing edge welds in either of the face-sections of the blades. It increases the transverse beam depth at the leading and trailing edges which avoids failure through the "breathing" to which the blade is subjected on account of the transverse, tensile and compression stresses at the leading and trailing edges. It avoids failures due to the greater stiffness in the heavily curved camber-sheet and the inertia forces of the central mass of the face-sheet impressing bending stresses at the edges.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The method of producing a hollow metal propeller blade from a tubular blank, which consists in providing the blank on opposite sides thereof with wall-portions of varying thickness, flattening the outer portion of the tubular blank upon itself with the greater wall-thickness at the folds, trimming the edges of the flattened portion of the blank to form face-sections extending approximately from mid-length of the blade to the tip along lines conformably to the leading and trailing edges of the blade, joining the sections along the leading and trailing edges, and expanding the joined sections to airfoil shape.

2. The method of producing a hollow metal propeller blade from a tubular blank, which consists in providing the blank on opposite sides thereof with wall-portions of varying thickness, flattening the outer portion of the tubular blank upon itself with the greater wall-thickness at the folds, trimming the edges of the flattened portion of the blank to form face-sections extending approximately from mid-length of the blade to the tip along lines conformably to the leading and trailing edges of the blade, with the greater wall-thickness at their margins and lesser thickness at their centers, inserting a strip of metal between the sections along the leading edge, joining the strip with the contiguous inner faces of the sections, joining the sections along the trailing edge, and expanding the joined sections to airfoil shape.

3. That improvement in the manufacture of hollow metal propeller blades from a hollow blank having a portion thereof of substantially uniform thickness for the formation of the airfoil portion of the blade, which comprises cutting away from the outer periphery of said hollow portion diametrically opposite longitudinally extending zones of a contour conforming approximately to the profile of the blade faces desired and leaving, for use in forming the leading and trailing edges, diametrically opposite longitudinally extending zones of greater thickness between the cutaway zones, severing from the hollow blank a portion of one of the zones of greater thickness by a cut which will produce margins of the desired profile for the trailing edge, joining the margins of the blank adjacent where said portion of greater thickness has been severed from the blank for the trailing edge, and shaping the portions having the cutaway zones into airfoil working faces with leading and trailing edges formed out of the zones of greater wall-thickness.

4. That improvement in the manufacture of hollow metal propeller blades from a tubular blank having a portion thereof of substantially uniform thickness for the formation of the airfoil portion of the blade, which comprises cutting away from the outer periphery of said tubular portion diametrically opposite longitudinally extending zones of a contour conforming approximately to the profile of the blade faces desired and leaving, for use in forming the leading and trailing edges, diametrically opposite longitudinally extending zones of greater thickness between the cutaway zones, flattening the tubular portion of the blank with folds in the zones of greater wall-thickness, trimming off a fold of the blank substantially to the desired profile for the trailing edge through a zone of greater thickness, joining the inner face of the cut margins of the blank for the trailing edge, and shaping the portions having the cutaway zones into airfoil working faces with leading and trailing edges formed out of the zones of greater wall-thickness.

5. That improvement in the manufacture of hollow metal propeller blades from a hollow blank having a portion thereof of substantially uniform thickness for the formation of the airfoil portion of the blade, which comprises cutting away from the outer periphery of said hollow portion diametrically opposite longitudinally extending zones of a contour conforming approximately to the profile of the blade faces desired and of greater depth along mid-chord lines and of gradually diminishing depth toward its longitudinal margins and leaving, for use in forming the leading and trailing edges, diametrically opposite longitudinally extending zones of greater thickness between the cutaway zones, severing from the blank a portion of one of the zones of greater thickness by a cut which will produce margins substantially of the desired profile for the trailing edge, joining the margins of the blank adjacent where said portion of greater thickness has been severed from the blank for the trailing edge, and shaping the portions having the cutaway zones into airfoil working faces with leading and trailing edges formed out of the zones of greater wall thickness.

6. That improvement in the manufacture of hollow metal propeller blades from a tubular blank having a portion thereof of substantially uniform thickness for the formation of the airfoil portion of the blade, which comprises cutting away from the outer periphery of said tubular portion diametrically opposite longitudinally extending zones of a contour conforming approximately to the profile of the blade faces desired and leaving, for use in forming the leading and trailing edges, diametrically opposite longitudinally extending zones of greater thickness between the cutaway zones, flattening the tubular blank with folds in the zones of greater wall-thickness, trimming of the folds substantially to the desired profile for the trailing and leading edges on a line through the zones of greater thickness, joining the inner faces of the cut margins of the blank for the trailing and leading edges, and shaping the portions having the cutaway zones into airfoil working faces with leading and trailing edges formed out of the zones of greater wall-thickness.

7. That improvement in the manufacture of hollow metal propeller blades from a tubular blank having a portion thereof of substantially uniform thickness for the formation of the airfoil portion of the blade, which comprises cutting away from the outer periphery of said tubular portion diametrically opposite longitudinally extending zones of a contour conforming approximately to the profile of the blade faces desired and leaving, for use in forming the leading and trailing edges, diametrically opposite longitudinally extending zones of greater thickness between the cutaway zones, flattening the blank with folds in the zones of greater wall-thickness, severing from the blank a portion of one of the zones of greater thickness by a cut which will produce margins substantially of the desired profile for the trailing edge, joining the inner faces of the cut margins of the blank for the trailing edge, expanding the blank between dies which produce smooth outer faces and so the irregularities from cutting away the metal will be transferred to the inside of the faces, and shaping the portions having the cutaway zones into airfoil working faces with leading and trailing edges formed out of the zones of greater wall-thickness.

GLEN T. LAMPTON.